United States Patent
Greenlee et al.

(10) Patent No.: US 8,024,608 B2
(45) Date of Patent: *Sep. 20, 2011

(54) SOLUTION FOR CHECKING A HEALTH OF A COMPUTER SYSTEM

(75) Inventors: Gordan Greenlee, Endicott, NY (US); Victoria Hanrahan-Locke, Fishkill, NY (US); James A. Martin, Jr., Endicott, NY (US); Douglas G. Murray, Johnson City, NY (US)

(73) Assignee: International Business Machines Corporation, Armonk, NY (US)

( * ) Notice: Subject to any disclaimer, the term of this patent is extended or adjusted under 35 U.S.C. 154(b) by 529 days.

This patent is subject to a terminal disclaimer.

(21) Appl. No.: 12/042,389

(22) Filed: Mar. 5, 2008

(65) Prior Publication Data

US 2008/0155558 A1 Jun. 26, 2008

Related U.S. Application Data

(63) Continuation of application No. 10/402,611, filed on Mar. 28, 2003, now Pat. No. 7,392,430.

(51) Int. Cl.
*G06F 11/00* (2006.01)
(52) U.S. Cl. .......... 714/25; 714/36; 714/39; 714/46; 714/27; 714/34
(58) Field of Classification Search .......... 714/25, 714/36, 39, 46, 27, 34
See application file for complete search history.

(56) References Cited

U.S. PATENT DOCUMENTS

| | | | |
|---|---|---|---|
| 4,135,240 A | 1/1979 | Ritchie | |
| 4,298,935 A * | 11/1981 | Lange et al. | 714/31 |
| 4,308,615 A * | 12/1981 | Koegel et al. | 714/46 |
| 4,514,846 A * | 4/1985 | Federico et al. | 714/45 |
| 4,967,337 A * | 10/1990 | English et al. | 700/79 |
| 5,010,487 A * | 4/1991 | Stonehocker | 701/29 |
| 5,175,800 A * | 12/1992 | Galis et al. | 706/45 |
| 5,200,958 A * | 4/1993 | Hamilton et al. | 714/45 |
| 5,467,449 A * | 11/1995 | Gauronski et al. | 714/57 |
| 5,983,364 A * | 11/1999 | Bortcosh et al. | 714/25 |
| 6,237,114 B1 * | 5/2001 | Wookey et al. | 714/47 |
| 6,279,123 B1 | 8/2001 | Mulrooney | |
| 6,360,336 B1 * | 3/2002 | Christensen et al. | 714/47 |
| 6,442,542 B1 | 8/2002 | Ramani | |
| 6,543,007 B1 | 4/2003 | Bliey et al. | |
| 6,754,664 B1 * | 6/2004 | Bush | 1/1 |

(Continued)

OTHER PUBLICATIONS

Truong, U.S. Appl. No. 10/402,611, Notice of Allowance & Fees Due, END920020097US1, Jan. 3, 2008, 11 pages.

(Continued)

*Primary Examiner* — Scott T Baderman
*Assistant Examiner* — Loan Truong
(74) *Attorney, Agent, or Firm* — William Schiesser; Hoffman Warnick LLC

(57) ABSTRACT

Under the present invention, a configurable dictionary is provided. The configurable dictionary includes a set of objects that identify: (1) attribute conditions of the computer system to be checked; (2) associated locations within the computer system for checking the attribute conditions; and (3) actions to be taken based on results of the checks for the computer system. The health of the computer system is checked by processing the set of objects in the configurable dictionary. Specifically, the attribute conditions identified in the configurable dictionary are checked at their associated locations, and any necessary action are implemented.

8 Claims, 3 Drawing Sheets

| ATTRIBUTE CONDITION | LOCATION | ACTION |
|---|---|---|
| DID BACKUP PROGRAM RUN | LOG FILE "A" | IF FILE MISSING, SEND MESSAGE |
| IS ANTI-VIRUS SOFTWARE ENABLED | C:/VIRUS.EXE/ PROPERTIES | IF DISABLED, THEN ENABLE |
| IS G:// DRIVE SHARED FOR FULL ACCESS? | G://PROPERTIES | IF SO SHARED, DISABLE AND SEND MESSAGE |
| EXECUTE INTRUSION DETECTION PROGRAM | | |
| EXECUTE RESOURCE DIAGNOSTIC PROGRAM | | |

U.S. PATENT DOCUMENTS

| | | | |
|---|---|---|---|
| 6,754,847 B2 | 6/2004 | Dalal et al. | |
| 6,768,935 B1 | 7/2004 | Morgan et al. | |
| 6,859,893 B2 | 2/2005 | Hines | |
| 6,901,582 B1 | 5/2005 | Harrison | |
| 6,990,600 B2 | 1/2006 | Ryan et al. | |
| 7,039,833 B2 | 5/2006 | Knuutila et al. | |
| 7,051,243 B2 | 5/2006 | Helgren et al. | |
| 7,092,937 B2 | 8/2006 | Morgan et al. | |
| 7,146,535 B2 * | 12/2006 | Little et al. | 714/26 |
| 7,146,536 B2 * | 12/2006 | Bingham et al. | 714/26 |
| 7,158,965 B1 * | 1/2007 | Greenberg et al. | 1/1 |
| 7,266,721 B2 | 9/2007 | Luick | |
| 7,565,338 B2 * | 7/2009 | Beniaminy et al. | 706/47 |
| 7,624,307 B2 * | 11/2009 | Davis et al. | 714/38 |
| 7,788,536 B1 * | 8/2010 | Qureshi et al. | 714/38.14 |
| 2001/0052087 A1 | 12/2001 | Garg et al. | |
| 2002/0165952 A1 | 11/2002 | Sewell et al. | |
| 2002/0194319 A1 | 12/2002 | Ritche | |
| 2003/0005362 A1 | 1/2003 | Miller et al. | |
| 2003/0028825 A1 * | 2/2003 | Hines | 714/37 |
| 2003/0097617 A1 * | 5/2003 | Goeller et al. | 714/39 |
| 2003/0110413 A1 | 6/2003 | Bernklau-Halvor | |
| 2003/0126504 A1 | 7/2003 | Ryan et al. | |
| 2003/0144806 A1 | 7/2003 | Jones | |
| 2003/0212928 A1 | 11/2003 | Srivastava et al. | |
| 2004/0163011 A1 | 8/2004 | Shaw | |
| 2004/0193956 A1 * | 9/2004 | Greenlee et al. | 714/25 |
| 2005/0192921 A1 | 9/2005 | Chaudhuri et al. | |

OTHER PUBLICATIONS

Truong, U.S. Appl. No. 10/402,611, Office Action Correspondence, END920020097US1, Jun. 29, 2007, 20 pages.

Truong, U.S. Appl. No. 10/402,611, Office Action Correspondence, END920020097US1, Jan. 12, 2007, 21 pages.

Truong, U.S. Appl. No. 10/402,611, Office Action Correspondence, END920020097US1, 06/06/06, 19 pages.

Truong, U.S. Appl. No. 10/402,611, Office Action Correspondence, END920020097US1, Dec. 23, 2005, 20 pages.

* cited by examiner

SOLUTION FOR CHECKING A HEALTH OF A COMPUTER SYSTEM

CROSS-REFERENCE TO PRIOR APPLICATIONS

This application is a Continuation of U.S. patent application Ser. No. 10/402,611, filed on Mar. 28, 2003 now U.S. Pat. No. 7,392,430, which is hereby incorporated by reference.

BACKGROUND OF THE INVENTION

1. Field of the Invention

The present invention generally relates to a system, method and program product for checking a health of a computer system. Specifically, the present invention utilizes a configurable dictionary to check the conditions of various attributes of a computer system, and to implement any necessary actions.

2. Background Art

As the use of computer technology becomes more prevalent, proper "health" maintenance thereof is essential. Specifically, many of today's business entities utilize computer systems to carry out their everyday functions. However, such computer systems are often compromised for various reasons such as the failure of backup software to execute, anti-virus programs being disabled, unauthorized drive shares being granted, etc. In many of these cases, the losses could be minimized by performing periodic checks of certain attributes within the computer systems. For example, checking the computer systems to verify the existence of certain files, registry entries, values in INI files, sequences of text in files, etc. could lead to early detection of potential problems. Unfortunately, such checks typically require a litany of disparate efforts that rely on the memory of an administrator and/or the coordination of numerous programs. For example, some of these attributes might have to be manually checked by an administrator, while others might be checked by various diagnostic programs. This problem is compounded by the fact that different attributes might have to be checked for different computer systems. This is especially problematic in a network environment where many different computer systems could operate.

Heretofore, many attempts have been made at providing computer system monitoring. None of these attempts, however, have utilized a "configurable" data structure that specifically identifies the attributes to be checked, and how/where to check them. To this extent, none of the previous attempts identify appropriate actions to be implemented based on the results of the checks. Using a configurable data structure would allow "health" checking to be both automated and customized for each computer system in operation. Moreover, it would allow the health checking efforts to be streamlined into one cohesive process.

In view of the foregoing, there exists a need for a system, method and program product for checking a health of a computer system. Specifically a need exists for the health of the computer system to be checked based on a configurable dictionary that identifies: (1) attribute conditions of the computer system to be checked; (2) associated locations within the computer system for checking the attribute conditions; and (3) actions to be taken based on results of the checks.

SUMMARY OF THE INVENTION

In general, the present invention provides a system, method and program product for checking a health of a computer system. Specifically, under the present invention, a configurable dictionary is provided. The configurable dictionary includes a set of objects that identify, among other things: (1) attribute conditions of the computer system to be checked; (2) associated locations within the computer system for checking the attribute conditions; and (3) actions to be taken based on results of the checks. The health of the computer system is checked by processing the set of objects in the configurable dictionary. Specifically, the attribute conditions identified in the configurable dictionary are checked at their associated locations, and any necessary actions are implemented.

According to a first aspect of the present invention, a system for checking a health of a computer system is provided. The system comprises: (1) a dictionary access system for accessing a configurable dictionary, wherein the configurable dictionary includes a set of attribute objects, and wherein each of the set of attribute objects identifies an attribute condition of the computer system to be checked, an associated location for checking the attribute condition and an action to be taken based on a result of the check; and (2) an analysis system for processing each of the set of attribute objects in the configurable dictionary.

According to a second aspect of the present invention, a method for checking a health of a computer system is provided. The method comprises: (1) accessing a configurable dictionary, wherein the configurable dictionary includes a set of attribute objects, and wherein each of the set of attribute objects identifies an attribute condition of the computer system to be checked, an associated location for checking the attribute condition and an action to be taken based on a result of the check; and (2) checking the health of the computer system by processing each of the set of attribute objects in the configurable dictionary.

According to a third aspect of the present invention, a program product stored on a recordable medium for checking a health of a computer system is provided. When executed, the program product comprises: (1) program code for accessing a configurable dictionary, wherein the configurable dictionary includes a set of attribute objects, and wherein each of the set of attribute objects identifies an attribute condition of the computer system to be checked, an associated location for checking the attribute condition and an action to be taken based on a result of the check; and (2) program code for processing each of the set of attribute objects in the configurable dictionary.

According to a fourth aspect of the present invention, a configurable dictionary for checking a health of a computer system is provided. The configurable dictionary comprises (1) a set of attribute objects, wherein each of the set of attribute objects identifies an attribute condition of the computer system to be checked, an associated location for checking the attribute condition and an action to be taken based on a result of the check.

Therefore, the present invention provides a system, method and program product for checking a health of a computer system.

BRIEF DESCRIPTION OF THE DRAWINGS

These and other features of this invention will be more readily understood from the following detailed description of the various aspects of the invention taken in conjunction with the accompanying drawings in which.

Figure 1:
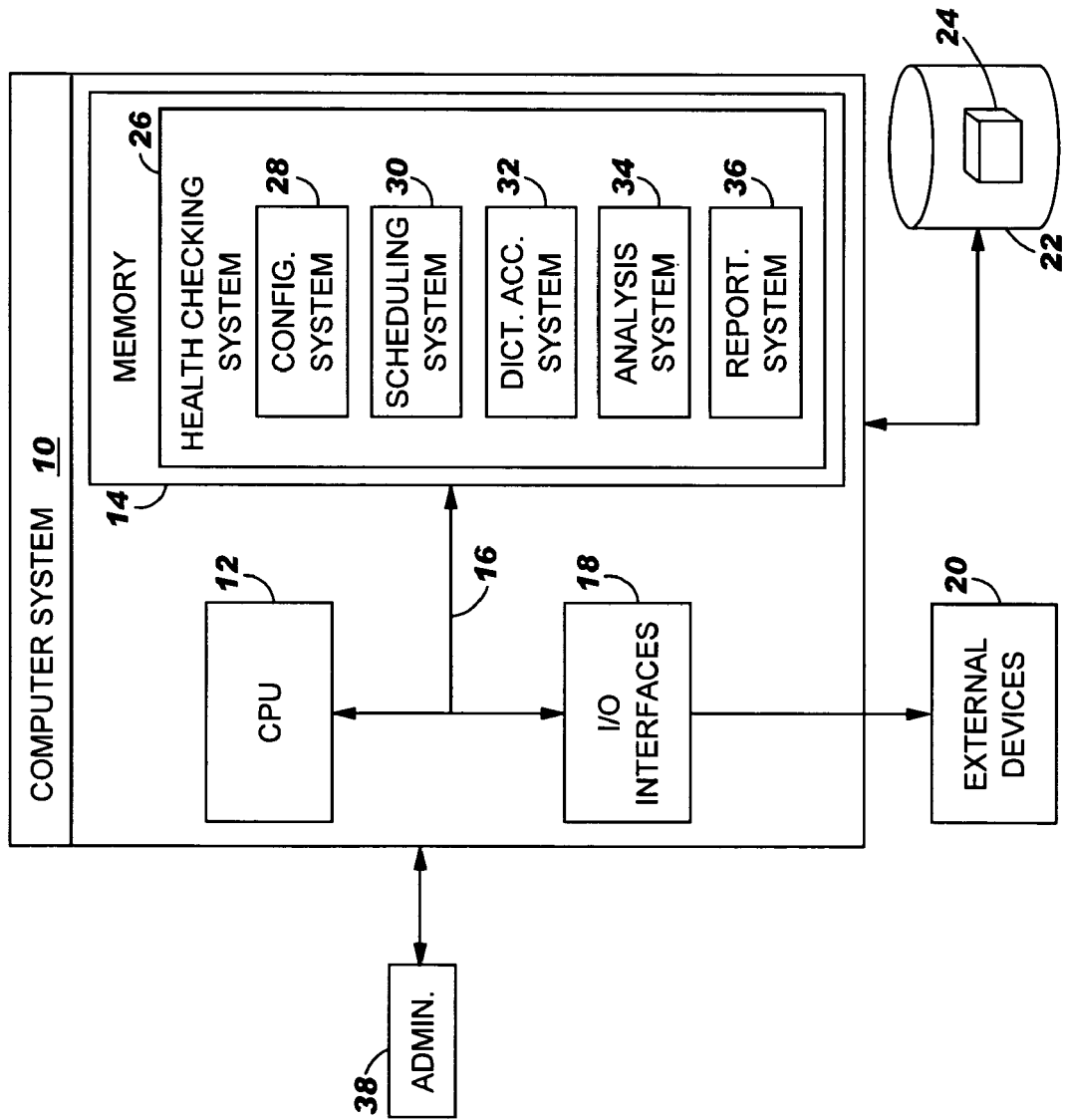
FIG. 1 depicts a computer system having a health checking system, according to the present invention.

The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

As indicated above, the present invention provides a system, method and program product for checking a health of a computer system (e.g., workstation, server, hand-held device, etc.). Specifically, under the present invention, a configurable dictionary is provided. The configurable dictionary includes a set of objects that identify, among other things: (1) attribute conditions of the computer system to be checked; (2) associated locations within the computer system for checking the attribute conditions; and (3) actions to take based on results of the checks. The health of the computer system is checked by processing the set of objects in the configurable dictionary. Specifically, the attribute conditions identified in the configurable dictionary are checked at their associated locations, and any necessary actions are implemented. The present invention thus provides a way to consolidate and streamline the various operations that must be performed to fully check the "health" of a computer system.

Referring now to FIG. 1, computer system 10 having health checking system 26 is shown. As depicted, computer system 10 includes central processing unit (CPU) 12, memory 14, bus 16, input/output (I/O) interfaces 18 and external devices/resources 20. CPU 12 may comprise a single processing unit, or be distributed across one or more processing units in one or more locations, e.g., on a client and server. Memory 14 may comprise any known type of data storage and/or transmission media, including magnetic media, optical media, random access memory (RAM), read-only memory (ROM), a data cache, a data object, etc. Moreover, similar to CPU 12, memory 14 may reside at a single physical location, comprising one or more types of data storage, or be distributed across a plurality of physical systems in various forms.

I/O interfaces 18 may comprise any system for exchanging information to/from an external source. External devices/resources 20 may comprise any known type of external device, including speakers, a CRT, LED screen, hand-held device, keyboard, mouse, voice recognition system, speech output system, printer, monitor/display, facsimile, pager, etc. Bus 16 provides a communication link between each of the components in computer system 10 and likewise may comprise any known type of transmission link, including electrical, optical, wireless, etc. In addition, although not shown, additional components, such as cache memory, communication systems, system software, etc., may be incorporated into computer system 10.

Storage unit 22 can be any system (e.g., a database) capable of providing storage for a configurable dictionary (CD) 24 under the present invention. As such, storage unit 22 could include one or more storage devices, such as a magnetic disk drive or an optical disk drive. In another embodiment, storage unit 22 includes data distributed across, for example, a local area network (LAN), wide area network (WAN) or a storage area network (SAN) (not shown). Storage unit 22 may also be configured in such a way that one of ordinary skill in the art may interpret it to include one or more storage devices.

Shown in memory 14 of computer system 10 is health checking system 26. It should be understood in advance that health checking system 26 could be implemented on a standalone workstation such as computer system 10 as shown, or in a network environment. For example, referring to FIG. 2, server 50 in communication clients 52A-D is shown. Health checking system 26 could be loaded on server 50 and/or one or more clients (e.g., client 52B). In either event, health checking system 26 could be utilized to check the health of server 50 or any client 52A-D within the network. It should be understood that communication between server 50 and clients 52A-D can occur via a direct hardwired connection (e.g., serial port), or via an addressable connection that may utilize any combination of wireline and/or wireless transmission methods. In the case of the latter, server 50 and clients 52A-D may be connected via the Internet, a wide area network (WAN), a local area network (LAN), a virtual private network (VPN) or other private network. The server 50 and clients 52A-D may utilize conventional network connectivity, such as Token Ring, Ethernet, WiFi or other conventional communications standards. Where clients 52A-D communicate with server 50 via the Internet, connectivity could be provided by conventional TCP/IP sockets-based protocol. In this instance, clients 52A-D would utilize an Internet service provider to establish connectivity to server 50.

Referring back to FIG. 1, health checking system 26 includes configuration system 28, scheduling system 30, dictionary access system 32, analysis system 34 and reporting system 36. Configuration system 28 typically includes an interface or the like for defining CD 24. In general, CD 24 is a definable data structure that facilitates the health checking of computer system 10 based on various attributes. For example, CD 24 could allow computer system 10 to be checked for, among other things, the existence/absence of a: (1) specific file (name/date/size); (2) registry entry (key/value); (3) value in an INI file (var/value); and/or (4) sequence of text in a file. In addition, CD 24 could cause a command to be executed, and any of these checks to be made on the results.

Figure 3:
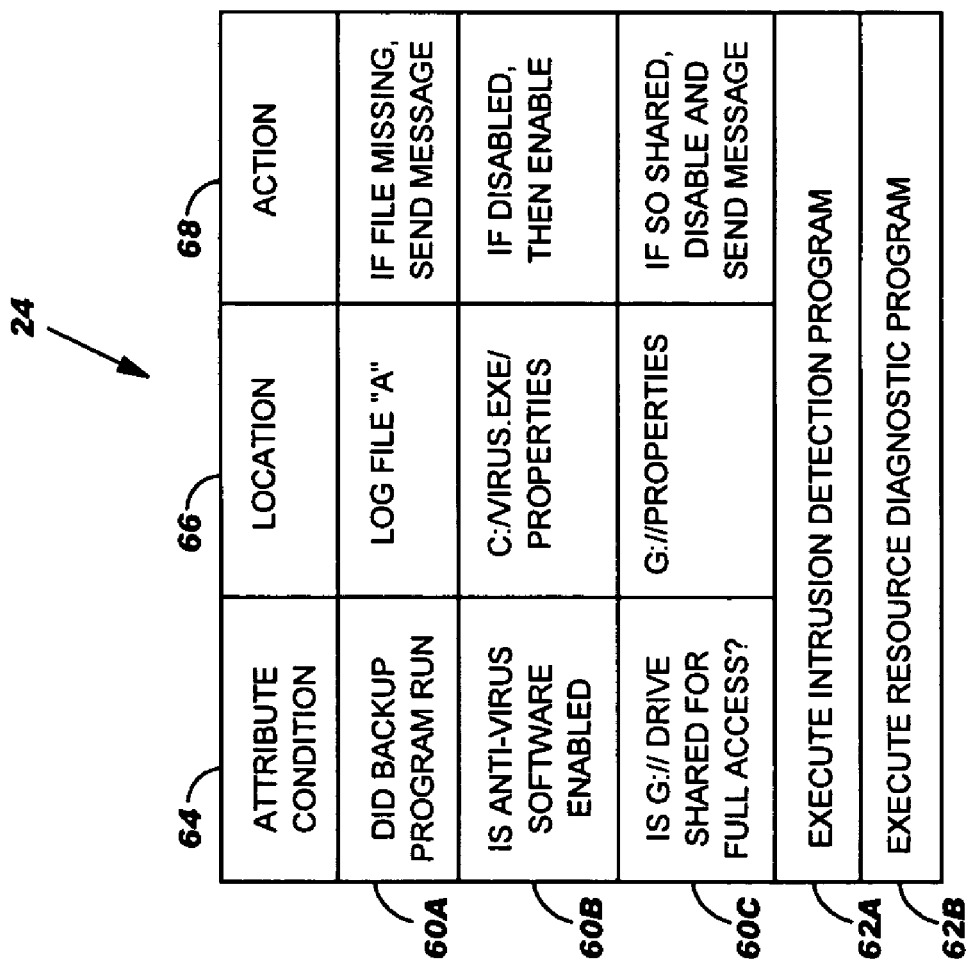
FIG. 3 depicts a configurable dictionary, according to the present invention.

Referring to FIG. 3, an illustrative CD 24 is shown. As depicted, CD 24 resembles a column-row matrix that includes a set (i.e., one or more) of attribute objects 60A-C and a set (i.e., one or more) of action objects 62A-B. Attribute objects 60A-C and action objects 62A-B are intended to represent any "unit" that is capable of storing data and/or instructions. Examples include records, data structures, etc. In any event, attribute objects 60A-C each identify an attribute condition 64 to be checked for computer system 10, an associated location 66 of the attribute condition 64 within computer system 10, and an action 68. As will be further discussed below, each attribute object 60A-C will be processed by checking the attribute conditions 64 at their associated locations 66. Based on the results of the checks, actions 68 can be implemented. For example, attribute object 60A pertains to a backup program running on computer system 10. Attribute condition 64 identifies the desired condition of the backup program, namely, whether the backup program has run. Location 66 identifies the precise location that can be checked to determine whether the backup program has run. In this example, the associated location 64 is log file "A." As indicated in action 68 column, if log file "A" is missing, backup likely did not occur and a message should be sent (e.g., to administrator 38 shown in FIG. 1).

As further shown in FIG. 3, each action object 62A-B of CD 24 identifies a specific action to be performed (i.e., a program to be executed). It could be the case that computer system 10 already includes programs that check specific conditions. Instead of reproducing the functions/efforts of those programs in an attribute object, the present invention could just cause those programs to execute.

It should be understood that the depiction of CD 24 is intended to be illustrative only, and that many variations could exist. For example, although shown as including three attribute objects 60A-C and two action objects 62A-B, CD 24 can actually include any quantity thereof. Moreover, although depicted as a column-row matrix, CD 24 can be represented in any suitable form (e.g., as any single or multidimensional structure). Still yet, the actions depicted in CD 24 are illustrative only and many variations are possible. For example, an action implemented under the present invention can involve: (1) an automatic direct system modification (e.g., file removal, registry entry removal, other system setting alteration, etc.) to restore/achieve health; (2) an executable program invoked, or acquired (e.g., via the world wide web, etc.) and invoked to restore/achieve health; (3) an informational dialog displayed with instructions regarding what steps to perform, or links to executable file(s) that will automatically perform the changes necessary to restore/achieve health; (4) any combination thereof; etc. It should also be understood that CD 24 can be customized for one or more particular computer systems. For example, separate CDs 24 could be provided for server 50 and each client 52A-D shown in FIG. 2. This recognizes that the health of different computers could be based on different attributes, conditions, locations, etc.

Figure 2:
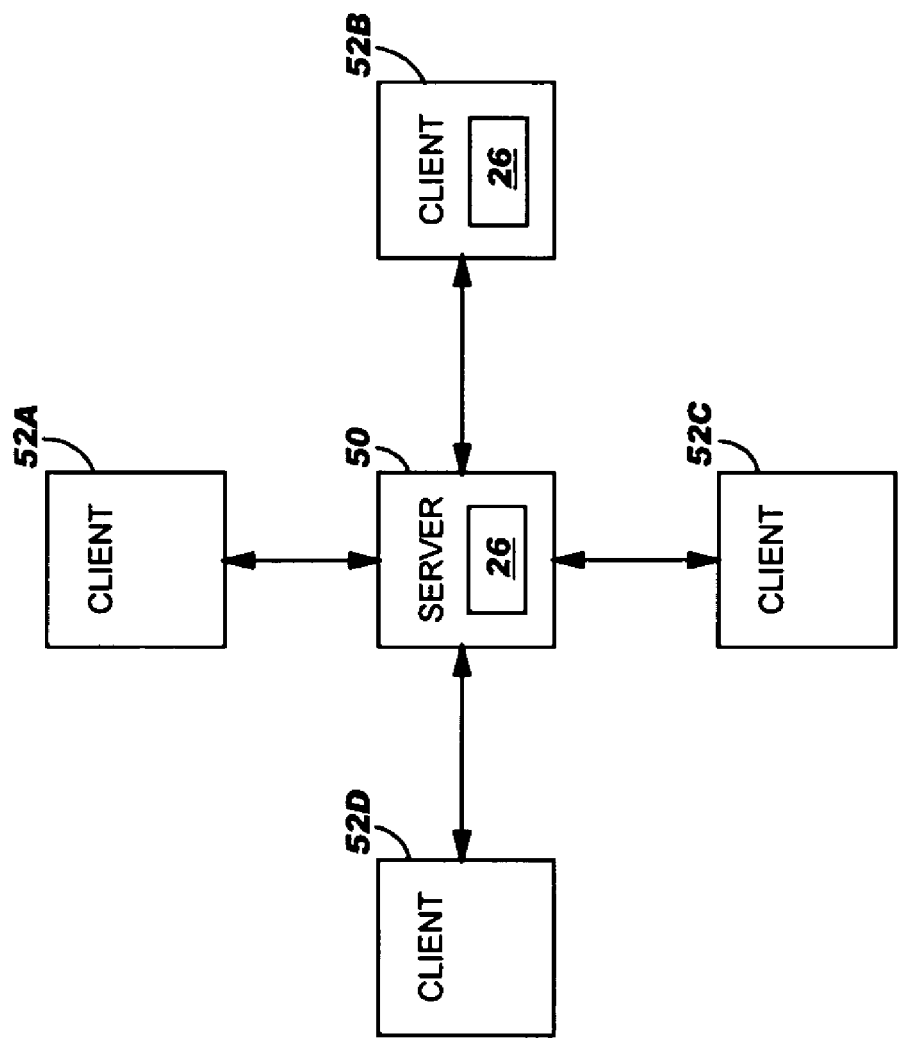
FIG. 2 depicts the health checking system of FIG. 1 in a distributed environment.

Referring back to FIG. 1, configuration system 28 allows administrator 38 or the like to create, update and/or delete CD 24. This provides great flexibility in designing a CD 24 that best suits computer system 10 and provides the most comprehensive health check. For example, although the same attribute conditions might be checked for computer systems "A" and "B," the associated locations might differ for each computer system. In any event, once CD 24 has been defined, scheduling system 30 allows the health checking of computer system 10 to run periodically in a background manner (e.g., every Sunday at midnight). Such scheduling provides consistent checking of computer system 10 without relying on the memory of administrator 38. However, should administrator 38 desire, the health checking of computer system 10 could run in a standalone manner (e.g., upon demand). To this extent, it should be understood that scheduling system 30 could incorporate any known "scheduling" technology. Moreover, although shown as being local to computer system 10, scheduling system 30 could actually be local or remote with respect to the computer system whose health is being checked. Regardless of how the health checking is scheduled, when the health of computer system 10 is to be checked, dictionary access system 32 will first access CD 24. Although shown stored in storage unit 22, CD 24 could actually be stored in any location (e.g., that is not "local" to computer system 10). This is especially the case when health checking system 26 is implemented in a network environment such as shown in FIG. 2. Regardless of where it is stored, dictionary access system 32 will access CD 24.

Once CD 24 is accessed, analysis system 34 will parse and process attribute objects 60A-C and action objects 62A-B to perform the health checking. Specifically, referring to FIGS. 1 and 3 collectively, analysis system 34 will check the attribute conditions 64 of attribute objects 60A-C at the associated locations 66. As described above, attribute condition 64 of attribute object 60A pertains to whether the backup program for computer system 10 has run. According to the associated location 66, log file "A" should be located to determine whether the backup program has run. Attribute objects 60B-C will be processed in a similar manner. For example, attribute condition 64 of attribute object 60B pertains to whether the anti-virus software is enabled. Location 66, indicates that this can be determined at the directory location of "c:/virus.exe/properties." Once attribute object 60A-C have been processed, analysis system 34 will then process action objects 62A-B by executing the identified programs. For example, in processing action object 62A an intrusion detection program will be executed.

After all attribute objects 60A-C and action object 62A-B in CD 24 have been processed by analysis system 34, report system 36 will report the results and recommended actions 68. The results can identify the checks that were made, programs that were executed, etc. The reporting can be made in any fashion such as a user message displayed to administrator 38, output written to a log file that is mailed or FTP'd to administrator 38, etc. In addition, report system 36 could optionally implement certain actions 68 identified in CD 24. For example, for attribute object 60B, after informing administrator 38 that the anti-virus software was disabled, report system 36 can automatically enable the anti-virus software.

As can be seen, the present invention provides a configurable way to check the health of a computer system. This provides optimal flexibility in adapting the health checking for each computer system. In addition, the present invention provides a way to streamline the various operations that must be performed to fully check the health of a computer system. Such capabilities have been unrecognized to date.

It is understood that the present invention can be realized in hardware, software, or a combination of hardware and software. Any kind of computer/server system(s)—or other apparatus adapted for carrying out the methods described herein—is suited. A typical combination of hardware and software could be a general purpose computer system with a computer program that, when loaded and executed, controls computer system 10 such it carries out the respective methods described herein. Alternatively, a specific use computer, containing specialized hardware for carrying out one or more of the functional tasks of the invention, could be utilized. The present invention can also be embedded in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of this invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims. For example, the various system shown in memory 14 of computer system 10 are depicted as shown for illustrative purposes only. It should be appreciated that they could be represented in any quantity of systems and/or subsystems.

What is claimed is:

1. A method for checking a health of a computer system, comprising:

accessing a configurable dictionary, wherein the configurable dictionary includes a set of text based user provided, user configurable attribute objects co-located in a table, and wherein each of the set of attribute objects identifies an attribute condition that represents a specific condition, with regard to a configuration of the software of the computer system, that is to be checked for with regard to the health of the computer system, an associated location, within the computer system, to be checked for the attribute condition and an action to be taken based on a result of the check; and checking the health of the computer system by processing each of the set of attribute objects in the configurable dictionary by checking the attribute condition at the associated location.

2. The method of claim 1, further comprising reporting the results of the checks of the attribute conditions.

3. The method of claim 1, further comprising implementing the action identified in each of the set of attribute objects.

4. The method of claim 1, wherein the configurable dictionary further comprises an action object that identifies a program to be executed, and wherein the method further comprises processing the action object by executing the program.

5. The method of claim 1, further comprising scheduling the checking of the health of the computer system.

6. The method of claim 1, further comprising defining the configurable dictionary, prior to the accessing step.

7. The method of claim 1, wherein the computer system is selected from the group consisting of a client and a server.

8. The method of claim 1, wherein the set of attribute objects is selected from the group consisting of a set of records and a set of data structures.

* * * * *